Figure 2:
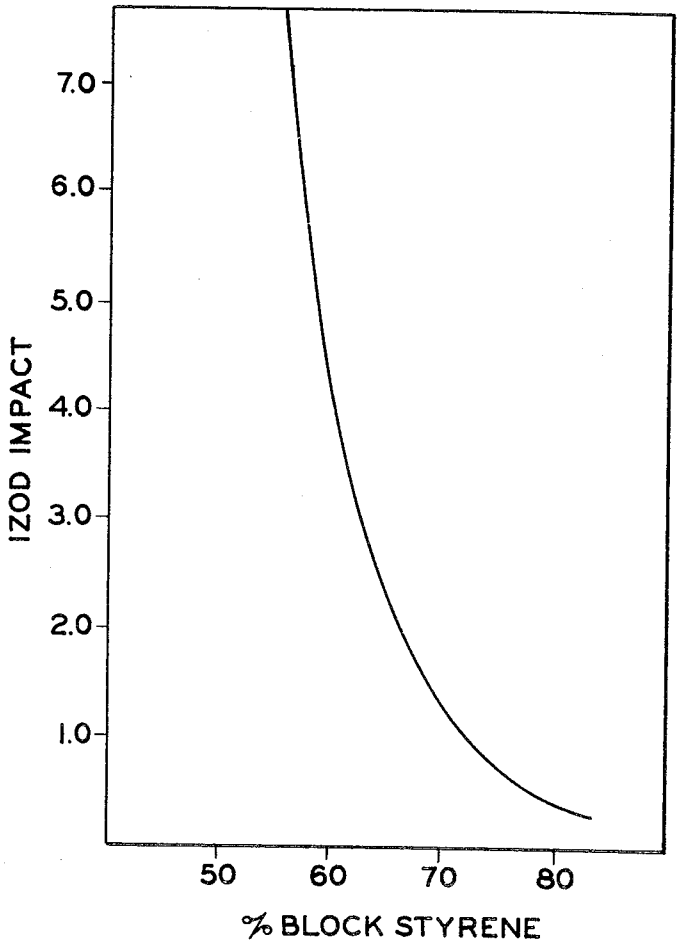
Figure 1:
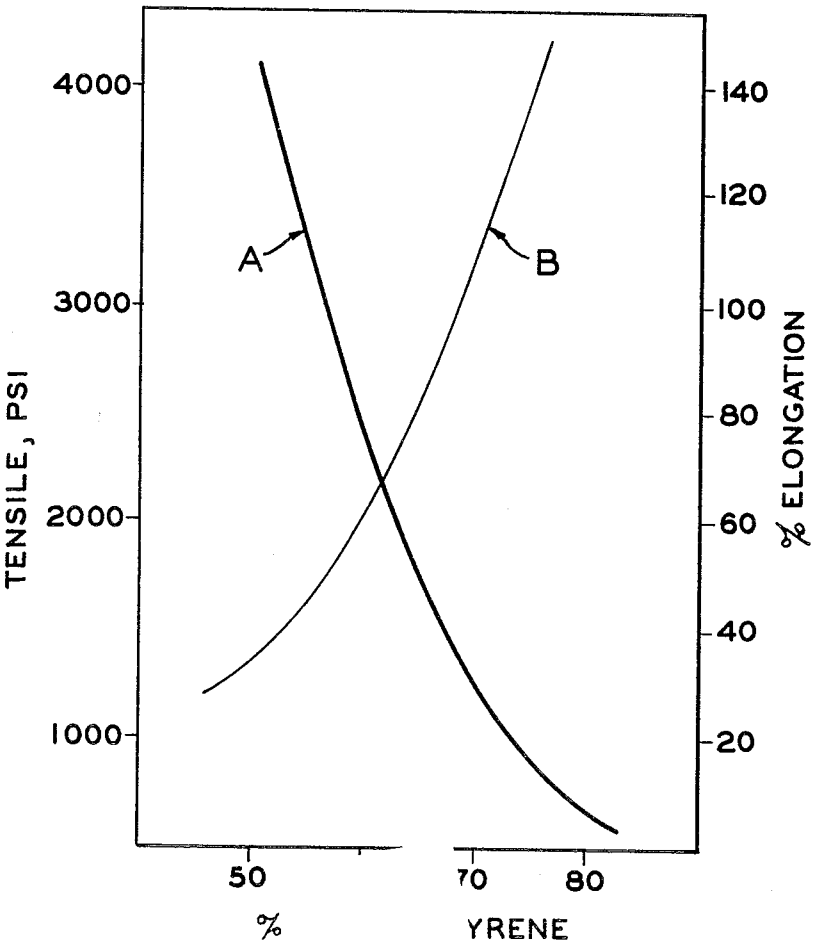

United States Defensive Publication [19] (H) [11] T953,011

Smith [43] Dec. 7, 1976

[54] TRANSPARENT IMPACT POLYSTYRENE PLASTICS OF MULTIPLE BLOCK COPOLYMERS

[75] Inventor: Robert C. Smith, Warren, Ohio

[73] Assignee: The Firestone Tire & Rubber Company, Akron, Ohio

[21] Appl. No.: 629,746

[22] Filed: Nov. 7, 1975

Related U.S. Application Data

[63] Continuation of Ser. No. 431,531, Jan. 7, 1974, abandoned, which is a continuation of Ser. No. 237,587, March 15, 1972, abandoned.

[51] Int. Cl.[2] ..... C08L 9/06

[52] U.S. Cl. ..... 260/880 B

[57] ABSTRACT

A transparent copolymer of butadiene and styrene of the BSBS type is produced which contains 60 to 90 per cent of block styrene, or preferably 70 to 85 per cent of block styrene. The copolymer is suitable for use in the manufacture of packaging films and molded items, including egg cartons, boxes of various types, window panes, etc.

2 Claims, 1 Sheet Drawing,

13 Pages Specification

The file of this unexamined application may be inspected and copies thereof may be purchased (849 O.G. 1221, Apr. 9, 1968).